(12) United States Patent
Lee et al.

(10) Patent No.: US 8,917,643 B2
(45) Date of Patent: Dec. 23, 2014

(54) METHOD FOR EFFICIENTLY MANAGING CARRIERS IN BROADBAND WIRELESS ACCESS SYSTEM

(75) Inventors: Eun Jong Lee, Anyang-si (KR); Ki Seon Ryu, Anyang-si (KR); In Uk Jung, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 255 days.

(21) Appl. No.: 13/377,813

(22) PCT Filed: Jun. 14, 2010

(86) PCT No.: PCT/KR2010/003807
§ 371 (c)(1),
(2), (4) Date: Apr. 19, 2012

(87) PCT Pub. No.: WO2010/143925
PCT Pub. Date: Dec. 16, 2010

(65) Prior Publication Data
US 2012/0230265 A1    Sep. 13, 2012

Related U.S. Application Data

(60) Provisional application No. 61/186,384, filed on Jun. 12, 2009.

(30) Foreign Application Priority Data

Jun. 14, 2010  (KR) .................. 10-2010-0055858

(51) Int. Cl.
*G08C 17/00* (2006.01)
*H04L 5/00* (2006.01)
*H04W 72/04* (2009.01)

(52) U.S. Cl.
CPC ........... *H04L 5/003* (2013.01); *H04W 72/0453* (2013.01)
USPC .......................................... 370/311; 370/329

(58) Field of Classification Search
USPC .................................................. 370/311, 329
See application file for complete search history.

(56) References Cited

U.S. PATENT DOCUMENTS

| 2006/0221894 | A1  | 10/2006 | Casaccia et al. |
| 2008/0159248 | A1  | 7/2008  | Li |
| 2009/0093255 | A1* | 4/2009  | Balasubramanian ......... 455/450 |
| 2009/0257387 | A1* | 10/2009 | Gholmieh et al. ............ 370/329 |

FOREIGN PATENT DOCUMENTS

JP         2008547333       12/2008

OTHER PUBLICATIONS

"IEEE 802.16m System Description Document [Draft]", May 31, 2009, Shkumbin Hamiti, Nokia.*

* cited by examiner

*Primary Examiner* — Jason Mattis
(74) *Attorney, Agent, or Firm* — Lee, Hong, Degerman, Kang & Waimey

(57) ABSTRACT

The present invention relates to a method and a device for managing carriers allocated to a terminal in a broadband wireless access system that supports multi-carrier. A method for managing carriers by a terminal in a broadband wireless access system supporting multi-carrier includes transmitting, to a base station, activation requests information for requesting the activation of at least one second carrier allocated from the base station through a first carrier according to the power state of the terminal, receiving, from the base station, a first message that includes activation indication information for indicating the activation of at least one target carrier of the at least one second carrier, and transmitting to the base station a second message which notifies the base station whether the at least one target carrier is ready per activation.

9 Claims, 6 Drawing Sheets

(a)

(b)

Contiguous Bandwidth(Carrier) Aggregation

Non-contiguous Bandwidth(Carrier) Aggregation

METHOD FOR EFFICIENTLY MANAGING CARRIERS IN BROADBAND WIRELESS ACCESS SYSTEM

CROSS-REFERENCE TO RELATED APPLICATIONS

This application is the National Stage filing under 35 U.S.C. 371 of International Application No. PCT/KR2010/003807, filed on Jun. 14, 2010, which claims the benefit of earlier filing date and right of priority to Korean Application Serial No. 10-2010-0055858, filed on Jun. 14, 2010, and also claims the benefit of U.S. Provisional Application Ser. No. 61/186,384, filed on Jun. 12, 2009, the contents of all of which are incorporated by reference herein in their entireties.

TECHNICAL FIELD

The present invention relates to a mobile communications system, and more particularly, to a method for managing carriers allocated to a mobile station in a broadband wireless access system that supports multiple carriers, and an apparatus for the method.

BACKGROUND ART

Hereinafter, a brief description of carriers will be given.

A user may perform modulation on the amplitude, frequency, and/or phase of a sine wave or a periodic pulse wave to include information which is desired to be transmitted. At this time, the sine wave or pulse wave serving to convey information is referred to as a carrier.

Methods for modulating a carrier include a single-carrier modulation (SCM) scheme and a multi-carrier modulation (MCM) scheme. The SCM scheme performs modulation such that all information is carried on a single carrier.

The MCM scheme divides an entire bandwidth channel of one carrier into subchannels having multiple narrow bandwidths and transmits multiple narrowband subcarriers through respective subchannels.

When the MCM scheme is used, each subchannel may approximate to a flat channel due to a narrow bandwidth. A user may compensate for distortion of a channel using a simple equalizer. Also, the MCM scheme may be implemented at a high speed using Fast Fourier Transform (FFT). Namely, the MCM scheme is favorable during high-rate data transmission as compared to the SCM scheme.

As the capabilities of a base station and/or a terminal have been developed, a frequency bandwidth which can be provided or used by the base station and/or the terminal has been enlarged. Accordingly, in the embodiments of the present invention, a multi-carrier system that supports broadband by aggregating one or more carriers is disclosed.

In other words, the multi-carrier system, which will be described hereinafter, uses carriers by aggregating one or more carriers, unlike the afore-mentioned MCM scheme which uses carriers by segregating one carrier.

In order to efficiently use multiple bands (multi-bands or multi-carriers), a technique in which one medium access control (MAC) entity manages multiple carriers (for example, multiple frequency carriers) has been suggested.

FIG. 1(a) and FIG. 1(b) illustrate methods for transmitting and receiving signals based on a multi-band radio frequency (RF) scheme.

In FIG. 1, one MAC layer in each of a transmitting end and a receiving end may manage multiple carriers to efficiently use the multiple carriers. At this time, to effectively transmit and receive the multiple carriers, it is assumed that both the transmitting end and the receiving end may transmit and receive the multiple carriers. Since frequency carriers managed by one MAC layer do not need to be contiguous, the above method enables flexible resource management. More specifically, the frequency carriers may have contiguous aggregation or non-contiguous aggregation.

In FIG. 1(a) and FIG. 1(b), physical layers (PHY 0, PHY 1, . . . , PHY n−2, and PHY n−1) represent multiple bands, each of which may have a frequency carrier (FC) size allocated for a specific service in accordance with a frequency policy which is previously defined. For example, PHY 0 (RF carrier 0) may have a frequency band size allocated for a general FM radio broadcast, and PHY 1 (RF carrier 1) may have a frequency band size allocated for cellular phone communication.

Although each frequency band may have a different FA size depending on their characteristics, it is assumed in the following description that each frequency carrier (FC) has a size of A MHz for convenience of description. Each frequency allocation (FA) band may be represented by a carrier frequency that enables a baseband signal to be used in each frequency band. Thus, in the following description, each frequency allocation band will be referred to as a "carrier frequency band" or will simply be referred to as a "carrier" representing each carrier frequency band unless such use causes confusion. Also, in the recent 3rd generation partnership project (3GPP) long term evolution-advanced (LTE-A), the carrier may also be referred to as a "component carrier" to discriminate it from a subcarrier used in the multi-carrier system.

As such, the "multi-band" scheme may also be referred to as a "multi-carrier" scheme or a "carrier aggregation" scheme.

FIG. 2 is a diagram illustrating an example of the use of multiple carriers in a general wireless communication system.

The multiple carriers of the general technology may employ contiguous carrier aggregation as shown in FIG. 2(a) or non-contiguous carrier aggregation as shown in FIG. 2(b). The combination unit of such carriers is a basic bandwidth unit of a general legacy system (e.g., Long Term Evolution (LTE) in an LTE-advanced system or IEEE 802.16e in an IEEE 802.16 m system). In a multi-carrier environment of the general technology, two types of carriers are defined as follows.

First of all, a first carrier (also, referred to as a primary carrier) is the carrier used by a mobile station and a base station to exchange traffic and full PHY/MAC control information. Further, the primary carrier may be used for general operations of the mobile station, such as network entry. Each mobile station has only one primary carrier per cell.

A second carrier (also, referred to as a secondary carrier) is an additional carrier that may be used for exchange of traffic based on base station specific allocation commands and rules, typically received from the first carrier. The secondary carrier may also include control signaling for supporting multi-carrier operation.

In the general technology, the carriers of a multi-carrier system based on the above-described primary and secondary carriers may be classified into a fully configured carrier and a partially configured carrier as follows.

First of all, the fully configured carrier refers to a carrier for which all control signaling actions including synchronization, broadcast, multicast and unicast control channels are configured. Further, information and parameters regarding multi-carrier operation and the other carriers may also be included in the control channels.

The partially configured carrier refers to a carrier in which all control channels for supporting downlink (DL) transmission are configured in a downlink carrier other than a pair of uplink carriers during Time Division Duplex (TDD) DL transmission or in a Frequency Division Duplex (FDD) mode.

Generally, the mobile station may perform initial network entry through the primary carrier, and may exchange mutual multi-carrier capability information with the base station in a registration process for exchanging an Advanced Air Interface (AAI) registration request response (AAI_REG-REQ/RSP) message.

Therefore, the mobile station acquires information of available carrier(s) of the base station, and the base station may allocate at least one of available secondary carriers to the mobile station. Prior to performing data exchange through the allocated carrier, the mobile station should perform activation for the corresponding carrier. In this respect, the present invention suggests a method for more efficiently activating a secondary carrier and an apparatus for performing the method.

DISCLOSURE

Technical Problem

Accordingly, the present invention has been devised to obviate one or more problems due to limitations and disadvantages of the related art, and an object of the present invention is to provide a method for efficiently activating a carrier between a mobile station and a base station under a multi-carrier environment.

Another object of the present invention is to provide an efficient method for allowing a mobile station to report active carriers in consideration of a status of the mobile station.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solutions

To achieve these objects and other advantages and in accordance with the purpose of the invention, as embodied and broadly described herein, according to one embodiment of the present invention, a method for managing carriers by a mobile station in a broadband wireless access system supporting multi-carrier comprises the steps of transmitting, to a base station, activation request information for requesting the activation of at least one second carrier allocated from the base station through a first carrier; receiving, from the base station, a first message that includes activation indication information for indicating the activation of at least one target carrier of the at least one second carrier; and transmitting, to the base station, a second message which notifies the base station whether the at least one target carrier is ready according to the activation. In this case, the activation request information is preferably determined according to a power status of the mobile station.

To achieve these objects and other advantages and in accordance with the purpose of the invention, according to one embodiment of the present invention, a method for managing carriers of a mobile station by a base station in a broadband wireless access system supporting multi-carrier comprises the steps of receiving, from the mobile station, activation request information for requesting the activation of at least one second carrier allocated to the mobile station through a first carrier; determining at least one target carrier, which will be activated, from the at least one second carrier, by using the activation request information; and transmitting, to the mobile station, a first message that includes activation indication information for indicating the activation of at least one target carrier. In this case, the activation request information is preferably determined according to a power status of the mobile station.

To achieve these objects and other advantages and in accordance with the purpose of the invention, according to another embodiment of the present invention, a mobile station supporting a multi-carrier operation in a broadband wireless access system comprises a processor; and a radio frequency (RF) module for transmitting and receiving radio signals to and from the outside under the control of the processor. In this case, the processor generates activation request information for requesting the activation of at least one second carrier allocated from the base station through a first carrier, in accordance with its power status and transmits the generated activation request information to the base station, and acquires activation indication information for indicating the activation of at least one target carrier of the at least one second carrier through a first message received from the base station.

In the aforementioned embodiments, the activation request information may include at least one of the maximum number of carriers and the minimum number of carriers, of which activation is requested by the mobile station, from the at least one second carrier.

Also, the mobile station may be operated by any one of a plurality of different power modes in accordance with the power status, and the activation request information may indicate types of the power modes.

Also, the activation request information may include at least one of information as to power connection of the mobile station and battery level information.

Preferably, the activation request information is transmitted to the base station through any one of a predetermined MAC management message, an extended header and a signaling header, the first message is a carrier management command (AAI_CM-CMD) message, the second message is a carrier management indication (AAI_CM-IND) message, and the second carrier is assigned to the mobile station through a multi-carrier response (AAI_MC-RSP) message.

Also, it is preferable that the first carrier is a primary carrier, and the second carrier is an assigned secondary carrier assigned from the base station to the mobile station.

Advantageous Effects

According to the embodiments of the present invention, the following advantages may be obtained.

First of all, as the embodiments of the present invention are used, a procedure of efficiently activating a carrier can be defined.

In addition, through the embodiments of the present invention, the base station can efficiently determine whether a secondary carrier has been activated, in consideration of a status of the mobile station.

It will be appreciated by persons skilled in the art that that the effects that could be achieved with the present invention are not limited to what has been particularly described here-

BEST MODE FOR CARRYING OUT THE INVENTION

Figure 1:
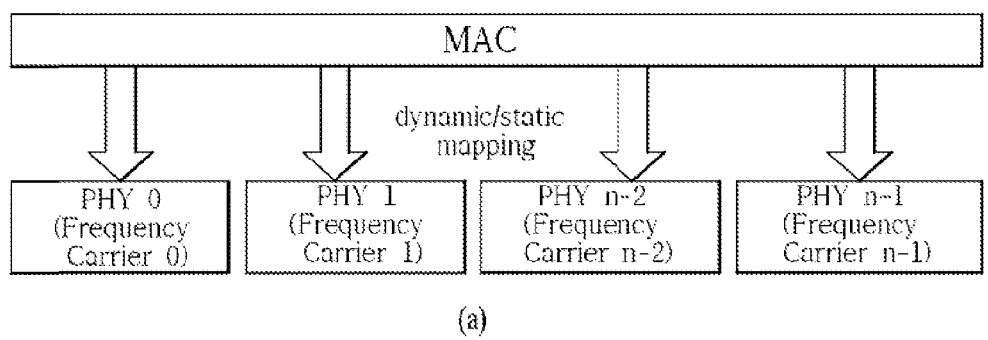
FIG. 1(a) and FIG. 1(b) are diagrams illustrating methods for transmitting and receiving signals based on a multi-band radio frequency (RF) scheme.
Figure 1:
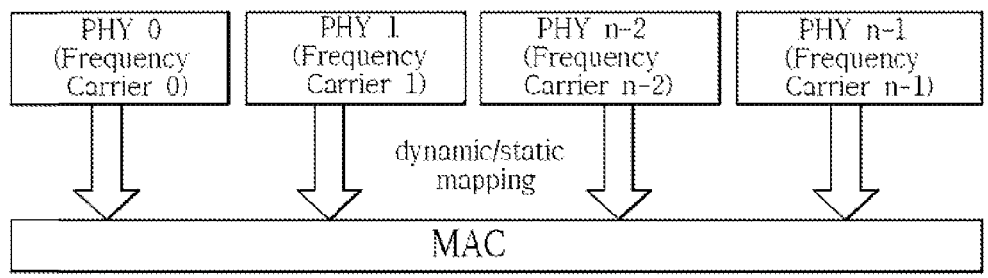
Figure 2:
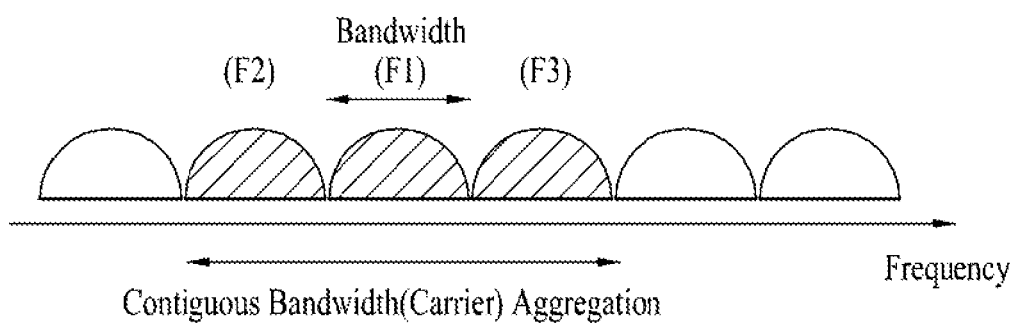
FIG. 2 is a diagram illustrating a utilization example of multiple carriers in a general wireless communication system.
Figure 2:
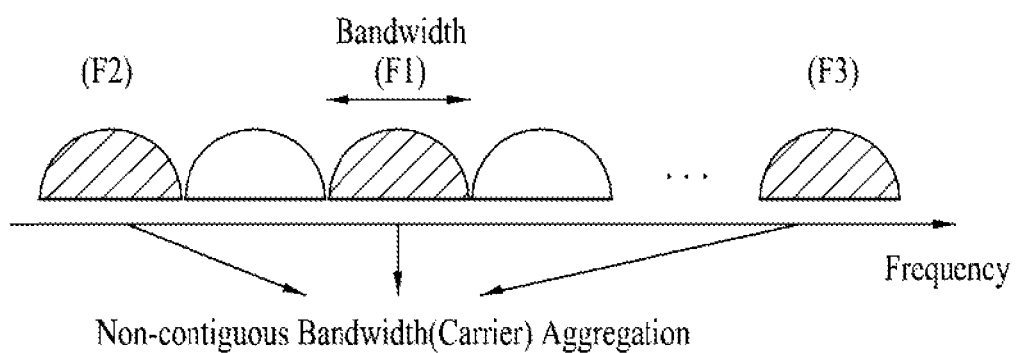

The present invention relates to a wireless access system. Hereinafter, the embodiments of the present invention will disclose methods for effectively managing multiple carriers.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, procedures or steps that may make the subject matter of the present invention obscure will not be disclosed. Also, procedures or steps that may be understood by the person with ordinary skill in the art will not be disclosed.

In this specification, the embodiments of the present invention have been described based on data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. At this time, the base station (BS) may be replaced with terms such as a fixed station, Node B, eNode B (eNB), an access point (AP) and advanced base station (ABS). Also, the mobile station (MS) may be replaced with terms such as a user equipment (UE), a subscriber station (SS), a mobile subscriber station (MSS), a mobile terminal (MT), an advanced mobile station (AMS), and a mobile terminal.

Also, a transmitting side means a node that provides data or voice services while a receiving side means a node that receives data or voice services. Accordingly, in an uplink, the mobile station could be a transmitting side while the base station could be a receiving side. Likewise, in a downlink, the mobile station could be a receiving side while the base station could be a transmitting side.

In the mean time, in the present invention, examples of the mobile station may include a personal digital assistant (PDA), a cellular phone, a personal communication service (PCS) phone, a global system for mobile (GSM) phone, a wideband CDMA (WCDMA) phone, and a mobile broadband system (MBS) phone.

The embodiments according to the present invention may be implemented by various means, for example, hardware, firmware, software, or their combination.

If the embodiment according to the present invention is implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, methods according to the embodiments of the present invention may be implemented by a type of a module, a procedure, or a function, which performs functions or operations described as below. For example, a software code may be stored in a memory unit and then may be driven by a processor. The memory unit may be located inside or outside the processor to transmit and receive data to and from the processor through various means which are well known.

The embodiments of the present invention may be supported by standard documents disclosed in at least one of wireless access systems, i.e., IEEE 802 system, 3GPP system, 3GPP LTE system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents. Particularly, the embodiments of the present invention may be supported by one or more of standard documents of IEEE 802.16 system, i.e., P802.16e-2004, P802.16e-2005, P802.16Rev2, and P802.16 m.

Also, specific terminologies hereinafter used in the embodiments of the present invention are provided to assist understanding of the present invention, and various modifications may be made in the specific terminologies within the range that they do not depart from technical spirits of the present invention.

The following description of the present invention assumes that the IEEE 802.16 system is used as an example. Specifically, in the following description, the mobile station refers to an advanced mobile station (AMS) that satisfies the IEEE 802.16m standard, and the base station refers to an advanced base station (ABS) that also satisfies the IEEE 802.16m standard.

First of all, terms for use in a multi-carrier operation will be defined as follows.

1. Available carrier refers to all carriers belonging to the base station ABS. The mobile station AMS may acquire information of the available carrier through an advanced air interface global carrier configuration (AAI_Global-config) message or a multi-carrier advertisement (AAI_MC-ADV) message.

2. Assigned carrier refers to a subset of an available carrier that is assigned to the mobile station AMS by the base station ABS depending on capability of the mobile station. That is, the base station ABS may assign at least one of its own available carriers to an assigned secondary carrier of the mobile station in consideration of capability of the mobile station AMS.

3. Active carrier refers to a carrier that is ready to perform data exchange between the mobile station AMS and the base station ABS, and may be a subset of the assigned carrier. Activation/deactivation of the assigned secondary carrier may be dependent upon the decision of the base station ABS based on a QoS (Quality of Service) request. The base station ABS may inform the mobile station AMS of information on whether to activate or deactivate a specific secondary carrier through a carrier management command (AAI_CM-CMD) message.

Based on the above-mentioned description, a procedure for allowing the base station ABS to assign a carrier to the mobile station AMS will hereinafter be described with reference to FIG. 3.

Figure 3:
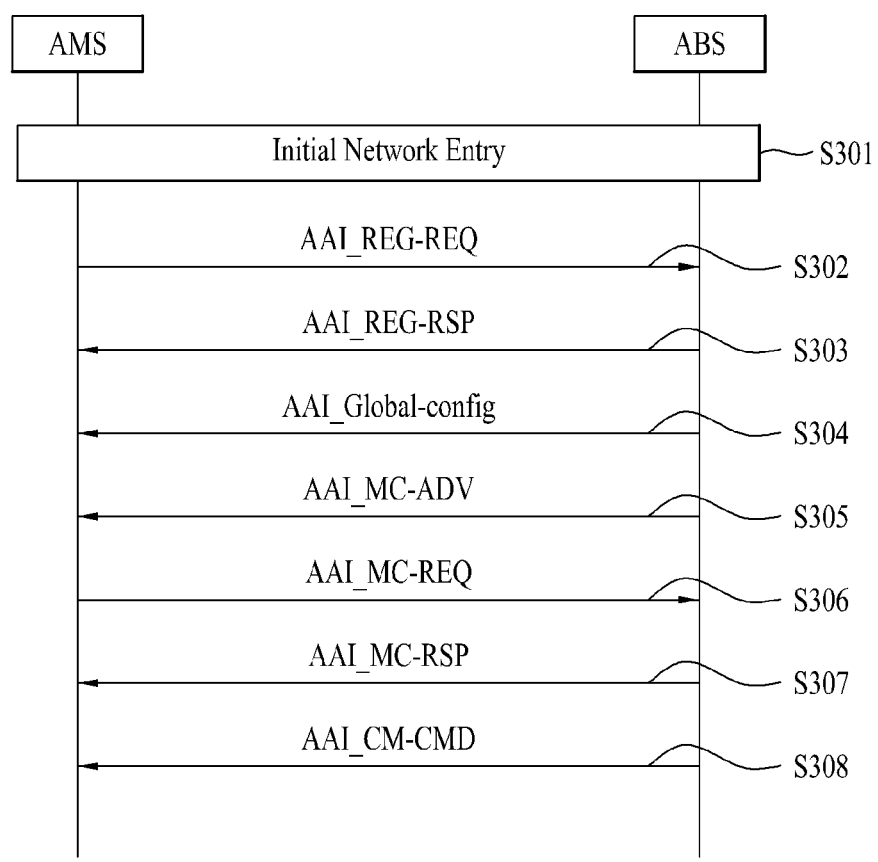
FIG. 3 is a flow chart illustrating an exemplary procedure for allowing a base station to allocate one or more carriers to a mobile station in a broadband wireless access system according to the present invention.

FIG. 3 is a flow chart illustrating an example of a procedure for allowing a base station ABS to assign one or more carriers to a mobile station AMS in a broadband wireless access system according to one embodiment of the present invention.

Referring to FIG. 3, the mobile station AMS performs initial network entry that includes a variety of processes, such as scanning, ranging, etc. (S301).

The mobile station AMS and the base station ABS may exchange information on mutual multi-carrier capabilities through a registration request/response (AAI_REG-REQ/RSP) message (S302 and S303).

The base station ABS transmits the AAI_REG-RSP message to the mobile station, and then transmits the global carrier configuration (AAI_Global-config) message (S304).

The global carrier configuration (AAI_Global-config) message may include information on all available carriers supported by a network.

Also, the mobile station AMS receives the AAI_MC-ADV message that is periodically broadcasted from the base station ABS, such that it can acquire information on multi-carrier configuration of the base station ABS (S305).

Afterwards, the mobile station AMS informs the base station ABS of information on the AMS's supportable carriers through the AAI_MC-REQ message in accordance with multi-carrier configurations of the ABS's available carriers upon receiving the acquired information, such that it can request the list of assigned carriers from the base station ABS (S306).

The base station ABS may decide a subset that will be assigned from the ABS's available carriers to the AMS's secondary carrier on the basis of information received from the mobile station AMS to decide the list of assigned carriers, and may inform the mobile station AMS of the decided list of assigned carriers through the AAI_MC-RSP message (S307).

Afterwards, the base station ABS may transmit a carrier management command (AAI_CM-CMD) message to the mobile station AMS in accordance with the decision based on the QoS request, such that it determines whether to activate or deactivate the assigned carrier given to the mobile station AMS (308).

A format of the carrier management command message may have a type of Table 1 as follows.

TABLE 1

| M/O | Attributes/Array of attributes | Size (bits) | Value/Note | Conditions |
|---|---|---|---|---|
| M | Action code | 1 | Indicate the purpose of this message<br>0b0: secondary carrier management<br>0b1: primary carrier change | NA |
| O | Indication Type | 2 | Indicate the corresponding secondary carrier is activated or deactivated<br>00: no action<br>01: deactivation only<br>10: activation only<br>11: both activation and deactivation | Shall be present when Action code is set to 0b0 in AAI_CM-CMD message |
| O | Activation Deadline | 6 | LSB bits of Superframe number after the AAI_CM-CMD is sent for the AMS to confirm the activation of secondary carrier by sending the AAI_CM-IND message | Shall be present when Indication Type is set to 10 or 11 in AAI_CM-CMD message |
| O | Num of target carrier | 3 | Indicate the number of secondary carrier(s) to be activated or deactivated<br>1..8 | Shall be present when Indication Type is set to 01 or 10 or 11 in AAI_CM-CMD message |
| O | Target carrier index | 3 | Indicate the secondary carrier index to be activated or deactivated<br>1..8 | Shall be present when Indication Type is set to 01 or 10 or 11 in AAI_CM-CMD message |
| O | Activation of DL/UL | 1 | Indicate the activation of DL or UL in the corresponding secondary carrier<br>0b0: Both DL/UL of the secondary | Shall be present when Indication Type is set to 10 or 11 in AAI_CM-CMD message |

TABLE 1-continued

| M/O | Attributes/Array of attributes | Size (bits) | Value/Note | Conditions |
|---|---|---|---|---|
| | | | carrier are activated<br>0b1: DL of the secondary carrier is activated but UL of the secondary carrier is not activated | |
| O | Ranging indicator | 1 | Indicate the periodic ranging is required for the carrier<br>0b0: no initial or periodic ranging is required for the carrier<br>0b1: periodic ranging is required for the carrier | Shall be present when Indication Type is set to 10 or 11 in AAI_CM-CMD message or shall be present when Action code is set to 0b1 in AAI_CM-CMD message |
| O | Deactivation of DL/UL | 1 | Indicate the deactivation of DL or UL in the corresponding secondary carrier<br>0b0: Both DL/UL of the secondary carrier are deactivated<br>0b1: UL of the secondary carrier is deactivated but DL of the secondary carrier is kept active | Shall be present when Indication Type is set to 01 or 11 in AAI_CM-CMD message |

Referring to Table 1, the AAI_CM-CMD message according to one embodiment of the present invention may include an action code, an indication type, an activation deadline, the number of target carriers, a target carrier index, a ranging indicator, and an uplink and downlink indicator field. Table 1 illustrates parameters related to activation/deactivation of the secondary carrier. If the corresponding message is used for primary carrier change, other parameters (for example, physical index of a primary carrier which will be changed, action time indicating carrier change time in a unit of superframe, and a field indicating next status of a previous primary carrier) may additionally be provided.

Hereinafter, a method for newly activating an assigned secondary carrier of a mobile station on the basis of the aforementioned multi-carrier assignment procedure according to one embodiment of the present invention will be described with reference to FIG. 4.

Figure 4:
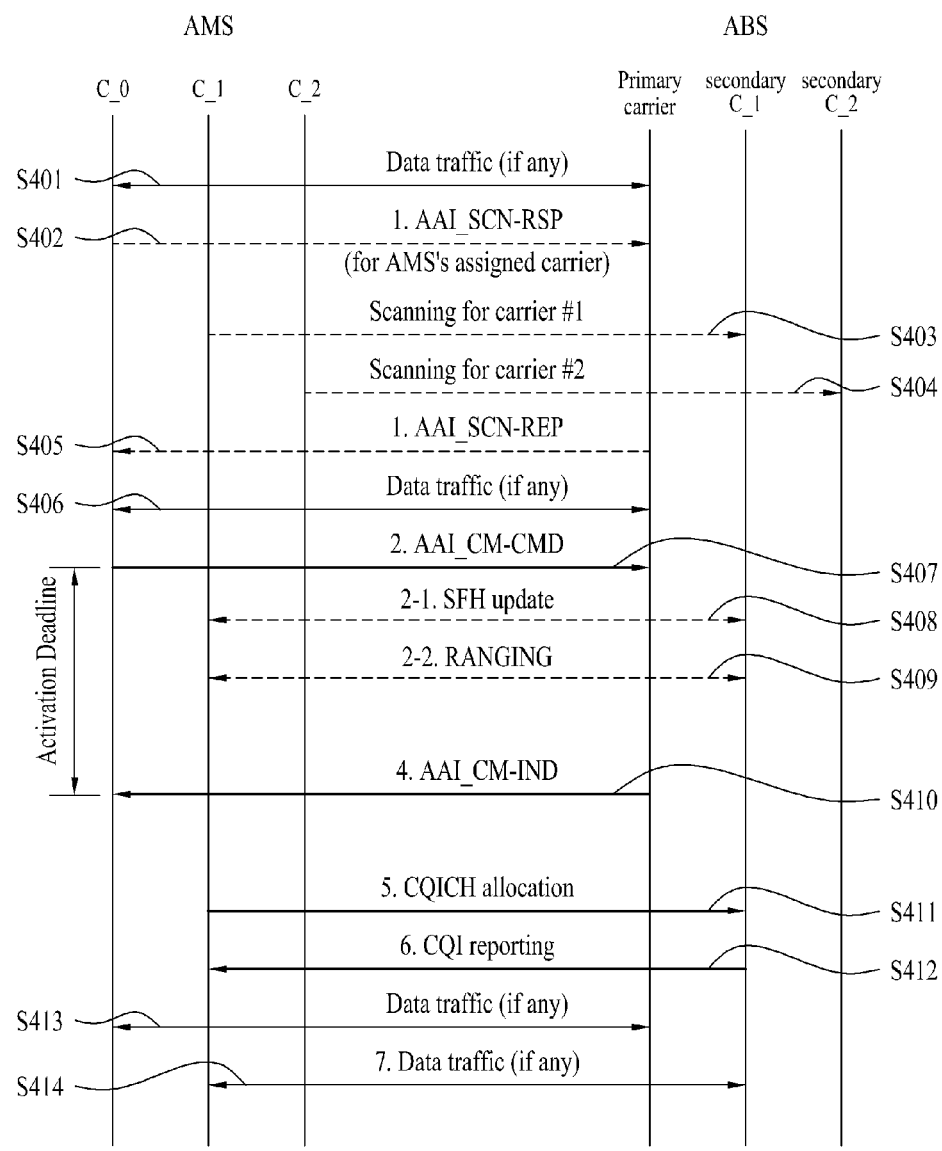
FIG. 4 is a flow chart illustrating a secondary carrier activation procedure according to one embodiment of the present invention.

FIG. 4 is a flow chart illustrating a secondary carrier activation procedure according to one embodiment of the present invention.

Referring to FIG. 4, it is assumed that the base station ABS uses three carriers (C_0 to C_2) as available carriers, the C_0 carrier is set to a primary carrier of the mobile station AMS, and the remaining carriers C_1 and C_2 are set to the assigned secondary carriers (i.e., the exchange of AAI_MC-REQ/RSP message has been completed).

First of all, the mobile station AMS may exchange data with the base station ABS through the primary carrier C_0 (S401).

The base station ABS transmits a scan response (AAI_SCN-RSP) message if necessary, such that it can command the mobile station AMS to scan the assigned secondary carriers (S402).

Therefore, the mobile station AMS may scan C_1 and C_2 carriers (S403 and S404), and may report the scanned result to the base station ABS (S405).

Afterwards, while the base station ABS and the mobile station AMS exchange data traffic with each other (S406), the base station ABS may transmit the AAI_CM-CMD message to the mobile station AMS so as to either satisfy QoS or indicate activation of the C_1 carrier owing to other reasons.

If necessary or in response to the parameter setup value of the AAI_CM-CMD message, the mobile station AMS may perform super frame header (SFH) update of the target carrier (C_1) (S408) or may perform periodic ranging of the target carrier (C_1) (S409).

If the activation of the corresponding carrier has been completed before the activation deadline has elapsed, the mobile station AMS transmits the AAI_CM-IND message to the base station ABS so as to inform the base station ABS of the completion of the carrier activation (S410).

Therefore, the base station ABS may allocate CQICH to the mobile station AMS (S411), and the mobile station AMS may report the CQI to the base station ABS (S412).

Afterwards, the mobile station AMS and the base station ABS exchange data with each other through the primary carrier (C_0) and the newly activated secondary carrier (C_1) (S413 and S414).

As described in the aforementioned secondary carrier activation procedure with reference with FIG. 4, activation/deactivation of the secondary carrier is triggered in accordance with the decision of the base station in the current IEEE 802.16m standard. In other words, the other assigned secondary carriers except for the primary carrier of the mobile station may be activated/deactivated only by the AAI_CM-CMD message based on the decision of the base station.

This is to allow the mobile station to monitor minimum carriers only if necessary because monitoring a control channel of all the secondary carriers that can be supported by capability of the mobile station may cause unnecessary power consumption.

However, if the secondary carriers are activated/deactivated through a MAC management message to monitor a minimum control channel only in spite of the sufficient power of the mobile station, it may cause unnecessary message transmission and reception and service delay.

First Embodiment

One embodiment of the present invention suggests that the mobile station that supports a multi-carrier directly may request the base station to activate the carrier.

To this end, the mobile station that supports a multi-carrier may notify the base station of the number of supportable secondary carriers through a predetermined MAC message in consideration of its battery mode (or power mode).

In this case, it is assumed that the battery mode of the mobile station according to this embodiment is divided into three modes of 1) always power-on mode, 2) power saving mode, and 3) maximum power saving mode. Also, it is assumed that the mobile station monitors the control channel of all the activated carriers.

Figure 5:
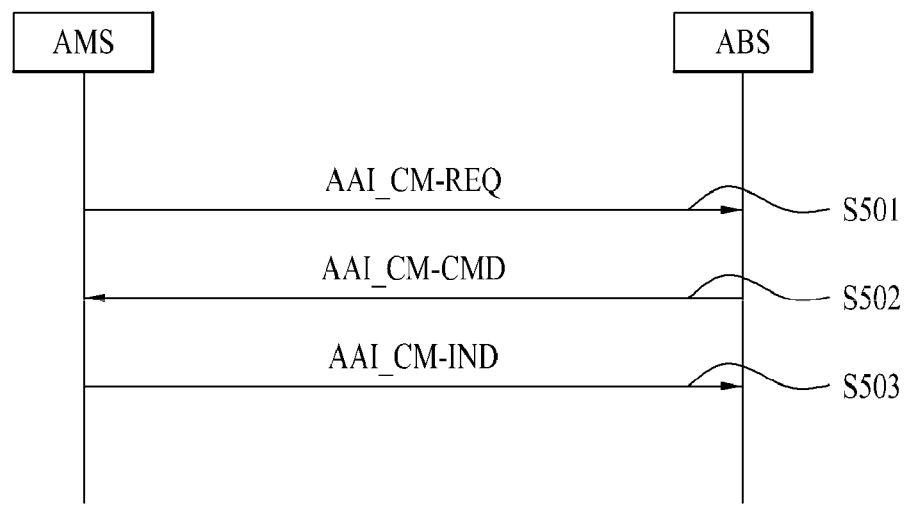
FIG. 5 is a diagram illustrating an example of a carrier activation request procedure of a mobile station to a base station in accordance with one embodiment of the present invention.

FIG. 5 is a diagram illustrating an example of a carrier activation request procedure of a mobile station to a base station in accordance with one embodiment of the present invention.

In FIG. 5, it is assumed that the mobile station that has completed the steps S301 to S307 of FIG. 3 performs steps preceded by the step of acquiring allocation carrier information from the base station.

First of all, the mobile station may transmit a message (hereinafter, referred to as "carrier management request (AAI_CM-REQ) message") for requesting the base station to activate a proper number of assigned secondary carriers (all or some of the assigned carriers) in consideration of its power mode (S501).

In more detail, if the power mode of the mobile station is the "always power-on mode", it means that the power of the mobile station is sufficient. Accordingly, the mobile station may transmit a message requesting the base station to activate all the assigned carriers (or as much as the number of assigned carriers requested by the mobile station) that can be supported by the mobile station than activate some carriers only necessary for power saving. If the power mode of the mobile station is the other power mode except for the "always power-on mode", the mobile station may request the base station to activate a proper number of carriers suitable for its power mode through the same request message.

The base station that has received the request message from the mobile station may transmit the AAI_CM-CMD message to the mobile station to activate the assigned carriers as much as those requested by the mobile station (S502).

Therefore, the mobile station may activate the secondary carriers indicated by the AAI_CM-CMD message and transmit the AAI_CM-IND message to the base station to report the carrier activation status at the time indicated by the activation deadline field of the AAI-CM-CMD message (S503).

At this time, parameters of the carrier management request message transmitted from the mobile station to the base station at the step S501 may include the following values.

Type or action code: this parameter indicates types of requesting carrier management procedures, and is preferably set to a value indicating secondary carrier activation.

Minimum number of active carriers (Nmin): this parameter means a value of a secondary carrier (that is, activation target carrier) of which activation can be commanded by the base station, among the assigned carriers of the mobile station. In other words, this parameter means that the mobile station requests the base station to always activate the secondary carrier as much as the value (Nmin) of this parameter. The mobile station may change this parameter value by retransmitting the AAI_CM-REQ message.

Maximum number of active carriers (Nmax): this parameter means a maximum value of a secondary carrier (that is, activation target carrier) of which activation can be commanded by the base station depending on the power mode status of the mobile station, among the assigned carriers of the mobile station. In other words, this parameter means that the secondary carrier exceeding the value (Nmax) of this parameter is not supported in consideration of the power mode of the mobile station. The mobile station may change this parameter value by retransmitting the AAI_CM-REQ message.

Hereinafter, detailed formats of the aforementioned parameters included in the AAI_CM-REQ message will be described with reference to Table 2 to Table 4.

Table 2 illustrates an example of a minimum number of activation carriers field included in the AAI_CM-REQ message according to one embodiment of the present invention.

TABLE 2

| Syntax | Size (bit) | Notes |
|---|---|---|
| Carrier Management Request message { | | |
| Management Message type = xxx | 8 | Carrier Management Request Message |
| Carrier Management Request type | 2 | 0b00: secondary carrier management<br>0b01: Primary carrier change<br>0b10: carrier switching<br>0b11: reserved |
| If (message type == 00) { | | |
| Minimum Number of carriers | TBD | Represents the number of minimum carriers that enables a mobile station to monitor a control channel |
| } | | |
| If (message type == 01){ | | |
| ... | TBD | If primary carrier change is triggered (requested) by the mobile station, necessary parameters may be defined. |
| } | | |
| If (message type == 10){ | | |
| | TBD | If carrier switching is triggered (requested) by the mobile station, necessary parameters may be defined. |
| } | | |
| } | | |

Referring to Table 2, the minimum number of activation carriers field (Nmin) may have a value between 1 and the number of assigned carriers M of the mobile station. If the corresponding field is set to 1, it indicates that the mobile station requests the base station to always activate the primary carrier only. If the corresponding field is set to M, it indicates that the mobile station requests the base station to always activate all the assigned carriers.

The base station that has received the AAI_CM-REQ message configured as Table 2 should always activate the carriers as much as the value of the minimum number of carriers field (Nmin), and may command the mobile station to activate the carriers as much as (Nmin+1) to M number of assigned carriers in accordance with its decision through the AAI_CM-CMD message.

Table 3 illustrates an example of a maximum number of activation carriers field included in the AAI_CM-REQ message according to one embodiment of the present invention.

TABLE 3

| Syntax | Size (bit) | Notes |
|---|---|---|
| Carrier Management Request message { | | |
| Management Message type == xxx | 8 | Carrier Management Request Message |
| Carrier Management | 2 | 0b00: secondary carrier |

TABLE 3-continued

| Syntax | Size (bit) | Notes |
|---|---|---|
| Request type | | management<br>0b01: primary carrier change<br>0b10: carrier switching<br>0b11: reserved |
| If (message type == 00) {<br>Maximum Number of carriers | TBD | Represents the number of maximum carriers that enables a mobile station to monitor a control channel |
| }<br>If (message type == 01){<br>... | TBD | If primary carrier change is triggered (requested) by the mobile station, necessary parameters may be defined. |
| }<br>If (message type == 10){<br>... | TBD | If carrier switching is triggered (requested) by the mobile station, necessary parameters may be defined. |
| }<br>} | | |

Referring to Table 3, the maximum number of activation carriers field (Nmax) may have a value between 1 and the number M of assigned carriers of the mobile station. If the corresponding field is set to 1, it indicates that the mobile station requests the base station to always activate the primary carrier only and that there is no secondary carrier that can be activated additionally. If the corresponding field is set to M, it indicates that the mobile station notifies the base station that all the assigned carriers may be activated/deactivated in accordance with QoS.

The base station that has received the AAI_CM-REQ message configured as Table 3 may assign carriers equivalent to the value of the maximum number of carriers field (Nmax) as the activation carriers of the mobile station. In other words, the base station may command the mobile station whether to activate/deactivate the carriers as much as 1 to M number of assigned carriers through the AAI_CM-CMD message.

Table 4 illustrates an example of a maximum number of activation carriers field and a minimum number of activation carriers field together included in the AAI_CM-REQ message according to one embodiment of the present invention.

TABLE 4

| Syntax | Size (bit) | Notes |
|---|---|---|
| Carrier Management Request message {<br>Management Message type = xxx | 8 | Carrier Management Request Message |
| Carrier Management Request type | 2 | 0b00: secondary carrier management<br>0b01: primary carrier change<br>0b10: carrier switching<br>0b11: reserved |
| If (message type == 00) {<br>Maximum Number of carriers | TBD | Represents the number of maximum carriers that enables a mobile station to monitor a control channel |

TABLE 4-continued

| Syntax | Size (bit) | Notes |
|---|---|---|
| Minimum Number of carriers | TBD | Represents the number of minimum carriers that enables a mobile station to monitor a control channel |
| }<br>If (message type == 01){<br>... | TBD | If primary carrier change is triggered (requested) by the mobile station, necessary parameters may be defined. |
| }<br>If (message type == 10){<br>... | TBD | If carrier switching is triggered (requested) by the mobile station, necessary parameters may be defined. |
| } | | |

Referring to Table 4, the minimum number of activation carriers field described with reference to Table 2 and the maximum number of activation carriers field described with reference to Table 3 may together be included in the AAI_CM-REQ message. Since the description of each field is similar to that described in Table 2 and Table 3, the repeated description will be omitted for conciseness of the specification.

If the base station receives the AAI_CM-REQ message configured as Table 4, it may always activate the assigned carriers as much as the value of the minimum number of activation carriers field but may determine whether to activate the other secondary carriers depending on services within the range that does not exceed the value of the maximum number of activation carriers field.

Second Embodiment

According to another embodiment of the present invention, a method for allowing a mobile station to request a base station to activate a carrier is provided as a method for allowing a mobile station to report its power mode or battery level to a base station.

In other words, the mobile station that supports a multi-carrier may report its power mode to the base station either periodically or whenever the mode is changed. The base station may determine whether to activate assigned carriers of the mobile station in accordance with the reported power mode of the mobile station. This may be used together with a message for reporting a general battery level to the base station or an extended header (EH).

In this case, it is assumed that the battery mode of the mobile station according to this embodiment is divided into three modes of 1) always power-on mode, 2) power saving mode, and 3) maximum power saving mode. Also, it is assumed that the mobile station monitors the control channel of all the activated carriers.

Figure 6:
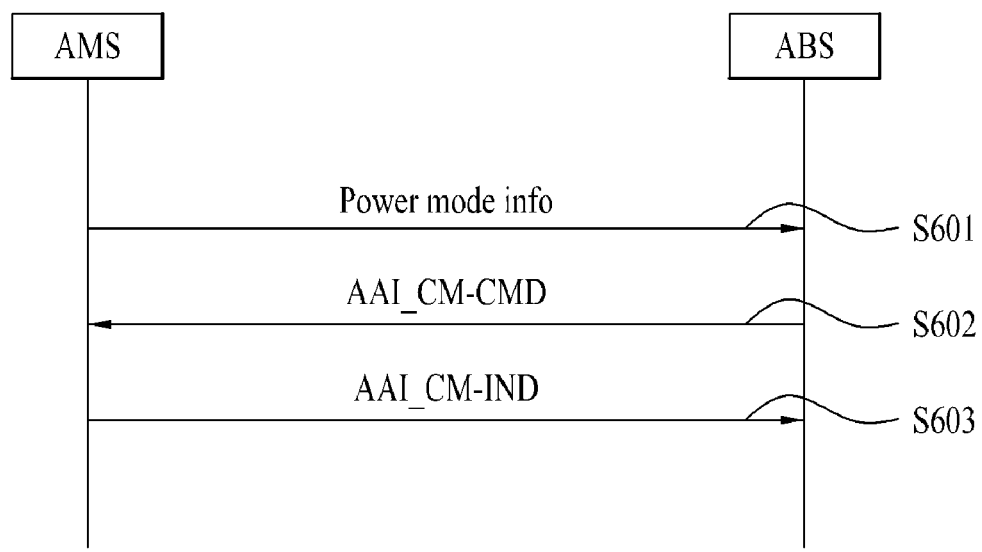
FIG. 6 is a diagram illustrating another example of a carrier activation request procedure of a mobile station to a base station in accordance with one embodiment of the present invention.

FIG. 6 is a diagram illustrating another example of a carrier activation request procedure of a mobile station to a base station in accordance with one embodiment of the present invention.

In FIG. 6, it is assumed that the mobile station that has completed the steps S301 to S307 of FIG. 3 performs steps preceded by the step of acquiring allocation carrier information from the base station.

First of all, the mobile station transmits information on its power mode to the base station (S601).

At this time, the information on the power mode may be transmitted to the base station in the form of an extended header (EH), a signaling header, a medium access control (MAC) management message or a feedback channel.

The base station that has received the information on the power mode of the mobile station may command the corresponding mobile station to activate the carrier by reporting information on the carrier for activation to the mobile station through the AAI_CM-CMD message in consideration of the power mode (S602).

For example, if the reported power mode of the mobile station is the "always power-on mode", it means that the power of the mobile station is sufficient. Accordingly, the base station may command the mobile station to activate all the assigned carriers that can be supported by the mobile station than activate some carriers only necessary for power saving, whereby signaling overhead that may additionally occur may be reduced. In other words, the base station may command the mobile station, which has reported that the power mode is the "always power-on mode", to activate all or some of the assigned carriers that can be supported fully by the corresponding mobile station, through the AAI_CM-CMD message. Also, the base station may reassign the feedback channel so that the mobile station may perform feedback (for example, CQI) report more frequently. Moreover, the base station may indicate that the mobile station does not need to report the battery level or power mode any more, through the AAI_CM-CMD message, or may not expect battery level report from the mobile station any more.

For another example, if the reported power mode of the mobile station is the "power saving mode" or "maximum power saving mode", the base station may determine the activation carrier of the mobile station in consideration of the power mode to support power saving of the mobile station more efficiently.

Therefore, the mobile station may activate the secondary carriers indicated by the AAI_CM-CMD message and transmit the AAI_CM-IND message to the base station to report carrier activation status at the time indicated by the activation deadline field of the AAI-CM-CMD message (S603).

An example of a signaling header type for reporting the aforementioned battery level to the base station will be described with reference to Table 5.

TABLE 5

| Syntax | Size (bit) | Notes |
| --- | --- | --- |
| AMS Battery Level Report header ( ) { | — | — |
| FID | 4 | Flow Identifier. This field indicates MAC signaling header. Set to 0001 |
| Type | 5 | MAC signaling header type = 0b00100 |
| Length | 3 | Indicates the length of the signaling header in bytes. |
| AMS Battery Status | 1 | 0b0: The AMS is plugged into a power source<br>0b1: The AMS is not plugged into a power source |
| Battery Level Indication | 1 | 0b0: Detailed battery level report is not included.<br>0b1: Detailed battery level report is included. |
| If (Battery Level Indication = 1) { | | |
| AMS Battery Level | 3 | 0b000: Battery level is >75% and <=100%<br>0b001: Battery level is >50% and <=75%<br>0b010: Battery level is >25% and <=50%<br>0b011: Battery level is >5% and <=25% |

TABLE 5-continued

| Syntax | Size (bit) | Notes |
| --- | --- | --- |
| | | 0b100: Battery level is below 5%<br>0b101-0b111: Reserved |
| Reserved<br>}<br>else {| 7 | Shall be filled by 0 |
| Reserved<br>}<br>} | 2 | Shall be filled by 0 |

Referring to Table 5, the signaling header for allowing the mobile station to report its battery level to the base station may include a flow identifier field set to a value (that is, 0001) indicating a signaling header, a type field set to a value indicating a signaling header for battery level report, a length field indicating a length of the signaling header, a battery status (AMS battery status) field indicating connection or not of power code, and a battery level indication field indicating whether it includes detailed information on a battery level. If the battery level indication field is set to 1, the signaling header may additionally include an AMS battery level field indicating the battery level of the mobile station at a unit of a predetermined %.

Although Table 5 illustrates the type of the signaling header in such a manner that the mobile station reports the battery level to the base station, a field the same as or similar to each of the aforementioned fields may be included in the MAC management message or the extended header.

Third Embodiment

According to still another embodiment of the present invention, a method for allowing a mobile station to request a base station to activate a carrier is provided as a method for allowing a mobile station to report its preferred carrier management mode to a base station.

In other words, the mobile station that supports a multi-carrier may report its preferred carrier management mode of one or more carrier management modes, which are previously set, to the base station either periodically or whenever the mode is changed. This may generally be used together with a message for reporting a battery level to the base station or a signaling header, or may be reported to the base station through the aforementioned AAI_CM-REQ message.

The following illustrates an example of carrier management mode configuration suggested in this embodiment.

Static mode: all the assigned carriers are activated.

Dynamic mode: at least a part of the assigned carriers may be activated/deactivated in accordance with a load status of the base station or services.

Interactive mode: the mobile station may request the base station of the number of preferred maximum/minimum activation carriers.

Since the aforementioned carrier management mode is exemplarily classified, less mode or more modes may be configured as the carrier management mode(s).

Hereinafter, a detailed format of the aforementioned carrier management mode reported to the base station will be described with reference to Table 6 and Table 7.

Table 6 illustrates an example of a carrier management request message type for allowing the mobile station to report a carrier management mode according to still another embodiment of the present invention to the base station.

TABLE 6

| Syntax | Size (bit) | Notes |
|---|---|---|
| Carrier Management Request message { | | |
| Management Message type = xxx | 8 | Carrier Management Request Message |
| Carrier Management Request type | 2 | 0b00: secondary carrier management<br>0b01: primary carrier change<br>0b10: carrier switching<br>0b11: reserved |
| If (message type == 00) { | | |
| Carrier management mode | 2 | 0b00: static mode<br>0b01: dynamic mode<br>0b10: interactive mode<br>0b11: reserved |
| If (Carrier management mode == 10){ | | In case of interactive mode |
| Maximum Number of carriers | TBD | Represents the number of maximum carriers that enables a mobile station to monitor a control channel |
| Minimum Number of carriers | TBD | Represents the number of minimum carriers that enables a mobile station to monitor a control channel |
| } | | |
| } | | |
| If (message type == 01){ | | |
| ... | TBD | If primary carrier change is triggered (requested) by the mobile station, necessary parameters may be defined. |
| } | | |
| If (message type == 10){ | | |
| ... | TBD | If carrier switching is triggered (requested) by the mobile station, necessary parameters may be defined. |
| } | | |
| } | | |

Referring to Table 6, the carrier management request (AAI_CM-REQ) message according to this embodiment may further include a carrier management mode field, whereby the mobile station may indicate the carrier management mode requesting the base station. If the corresponding field is set to 0b10, the maximum number of activation carriers field and the minimum of activation carriers field may further be included in the carrier management request (AAI_CM-REQ) message.

Since the description of each field is similar to that described with reference to Table 2 to Table 4 of the first embodiment according to the present invention, the repeated description will be omitted for conciseness of the specification.

Next, Table 7 illustrates an example of a carrier management mode report message type for allowing the mobile station to report a carrier management mode according to still another embodiment of the present invention to the base station.

TABLE 7

| Syntax | Size (bit) | Notes |
|---|---|---|
| Carrier Management Mode Report { | | |
| Carrier Management Mode | 2 | 0b00: static mode<br>0b01: dynamic mode<br>0b10: interactive mode<br>0b11: reserved |
| If (Carrier management mode == 10){ | | In case of interactive mode |
| Maximum Number of carriers | TBD | Represents the number of maximum carriers that enables a mobile station to monitor a control channel |
| Minimum Number of carriers | TBD | Represents the number of minimum carriers that enables a mobile station to monitor a control channel |
| } | | |
| } | | |

Referring to Table 7, the carrier management mode report message according to this embodiment may further include a carrier management mode field as a message newly defined in the present invention to report the carrier management mode only, whereby the mobile station may indicate the carrier management mode requesting the base station. If the corresponding field is set to 0b10, the maximum number of activation carriers field and the minimum of activation carriers field may further be included in this carrier management mode report message.

Configuration of Mobile Station and Base Station

Hereinafter, a mobile station AMS and a base station ABS (femto BS (FBS) and macro BS (MBS)) for implementing the aforementioned embodiments of the present invention will be described in accordance with further still another embodiment of the present invention.

The mobile station AMS may be operated as a transmitter on an uplink and as a receiver on a downlink. Also, the base station ABS may be operated as a receiver on the uplink and as a transmitter on the downlink. In other words, each of the mobile station AMS and the base station ABS may include a transmitter and a receiver for transmission of information or data.

The transmitter and the receiver may include a processor, modules, parts, and/or means for implementing the embodiments of the present invention. Especially, the transmitter and the receiver may include a module (means) for encrypting messages, a module for interpreting encrypted messages, an antenna for transmitting and receiving messages, etc. An example of the transmitter and the receiver will be described below with reference to FIG. 7.

Figure 7:
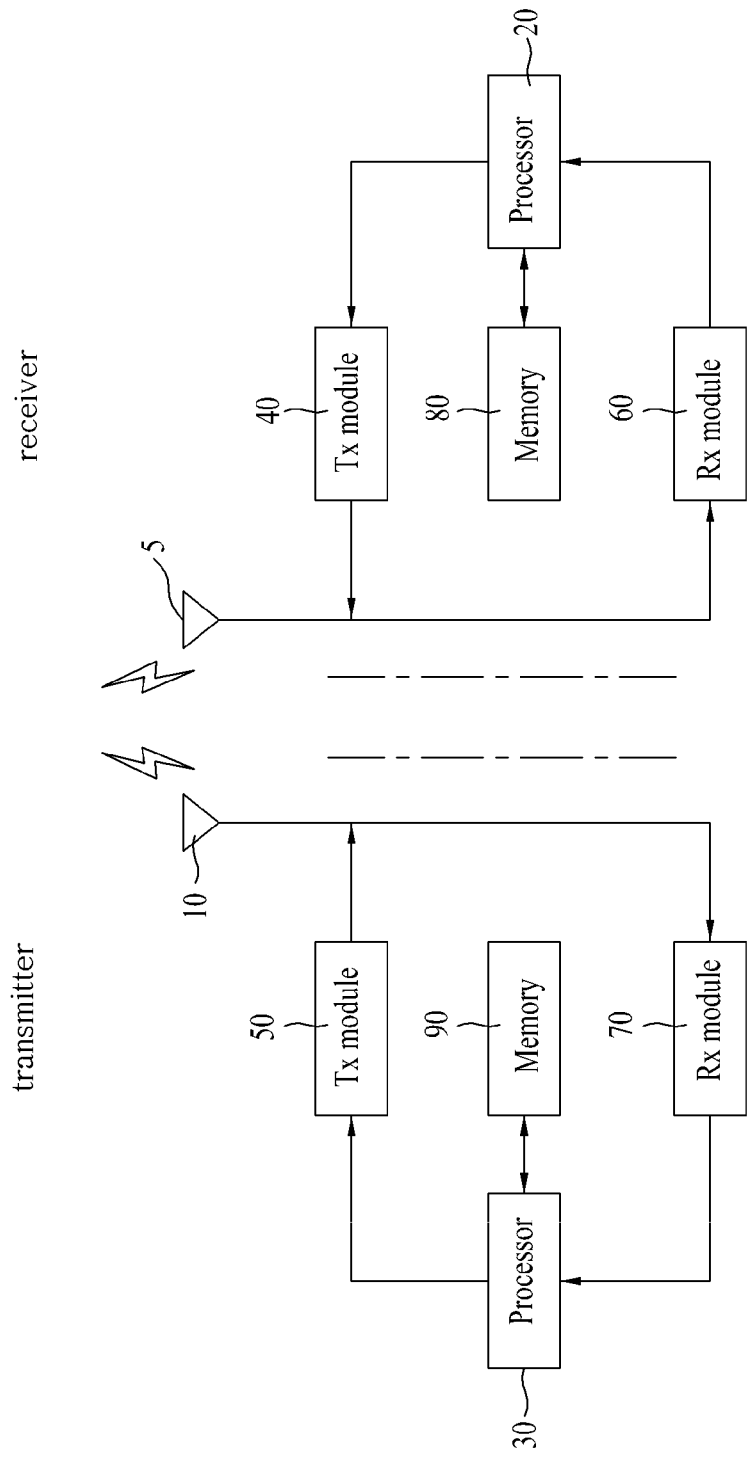
FIG. 7 is a block diagram illustrating an example of a transmitter and a receiver according to further still another embodiment of the present invention.

FIG. 7 is a block diagram illustrating an example of a transmitter and a receiver according to further still another embodiment of the present invention.

Referring to FIG. 7, the left part corresponds to the transmitter and the right part corresponds to the receiver. Each of the transmitter and the receiver may include an antenna 5 or 10, a processor 20 or 30, a Transmission (Tx) module 40 or 50, a Reception (Rx) module 60 or 70, and a memory 80 or 90. The components of the transmitter are complementary to those of the receiver. The components of the transmitter and the receiver will be described below in more detail.

The antenna 5 or 10 serves to transmit signals generated from the Tx module 40 or 50 or externally receive radio frequency (RF) signals and transfer the received RF signals to the Rx module 60 or 70. If a Multiple Input Multiple Output (MIMO) function is supported, two or more antennas may be provided.

The antenna, the Tx module, and the Rx module may together constitute an RF module.

The processor 20 or 30 generally controls the overall operation of the mobile station. For example, the processor 20 or 30 may perform a controller function for implementing the aforementioned embodiments of the present invention, a variable Medium Access Control (MAC) frame control function based on service characteristics and a propagation environment, a handover (HO) function, an authentication and encryption function, etc. In more detail, the processor 20 or 30 may provide overall control to perform the HO procedure shown in FIG. 5 to FIG. 7.

In particular, the processor of the mobile station AMS may acquire available carrier information of the base station ABS through multi-carrier-associated messages (e.g., AAI_MC-ADV, AAI_Global-config), and may also acquire information of the assigned carrier through the AAI_MC-REQ/RSP messages exchanged with the base station ABS. In addition, the processor of the mobile station AMS may receive an indication item related to carrier management from the base station ABS through the AAI_CM-CMD message, recognize the indication item, and inform the base station ABS of the execution or non-execution of the corresponding indication item through the AAI_CM-IND message. In this case, if the indication item indicated by the base station ABS is indicative of the activation of the secondary carrier, it is preferable that transmission of the AAI_CM-IND message be performed either at a specific time indicated by the activation deadline field included in the AAI_CM-CMD message or at any time prior to the specific time.

At this time, the processor of the mobile station AMS may request the base station to activate its assigned carrier by reporting its status (for example, power level) to the base station through various methods.

In addition, the processor of the mobile station AMS may perform the overall control for the operations described in the aforementioned embodiments.

The Tx module 40 or 50 may perform predetermined coding and modulation for data, which are scheduled from the processor 20 or 30 and will be transmitted to the outside, and then may transfer the coded and modulated data to the antenna 10.

The Rx module 60 or 70 may recover original data by decoding and demodulating data received through the antenna 5 or 10 and provide the recovered data to the processor 20 or 30.

The memory 80 or 90 may store programs for processing and control of the processor 20 or 30 and temporarily store input/output (I/O) data. Also, the memory 80 or 90 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, an optical disc, etc.

In the mean time, the base station ABS may perform a control function for implementing the aforementioned embodiments of the present invention, Orthogonal Frequency Division Multiple Access (OFDMA) packet scheduling, Time Division Duplex (TDD) packet scheduling and channelization, a variable MAC frame control function based on service characteristics and a propagation environment, a real-time high-speed traffic control function, a handover function, an authentication and encryption function, a packet modulation/demodulation function for data transmission and reception, a high-speed packet channel coding function, a real-time MODEM control function, etc., through at least one of the aforementioned modules, or the base station ABS may further include an additional means, module, or part for performing these functions.

Those skilled in the art will appreciate that the present invention may be carried out in other specific ways than those set forth herein without departing from the spirit and essential characteristics of the present invention. It is also obvious to those skilled in the art that claims that are not explicitly cited in each other in the appended claims may be presented in combination as an embodiment of the present invention or included as a new claim by a subsequent amendment after the application is filed.

Industrial Applicability

Although the aforementioned method for managing a multi-carrier more efficiently in a broadband wireless access system has been described based on the IEEE 802.16m system, it may be applied to various mobile communication systems in addition to the IEEE 802.xx system.

The invention claimed is:

1. A method for managing carriers by a mobile station (MS) in a wireless access system that supports multi-carrier, the method comprising:
    transmitting activation request information to a base station (BS) through a primary carrier for indicating a carrier management mode of the MS according to power status of the MS;
    receiving, a carrier management command message from the BS for activating at least one secondary carrier indicated by the activation request information; and
    transmitting a carrier management indication message to the BS for reporting carrier activation status after the MS activates the at least one secondary carrier,
    wherein the activation request information includes information related to a number of secondary carriers to be activated if the carrier management mode is a first mode,
    wherein the activation request information does not include the information related to the number of secondary carriers to be activated in order to activate all secondary carriers supported by the MS if the carrier management mode is a second mode, and
    wherein power status of the second mode is greater than power status of the first mode.

2. The method according to claim 1, wherein the activation request information includes at least a maximum number of the secondary carriers to be activated or a minimum number of the secondary carriers to be activated if the carrier management mode is the first mode.

3. The method according to claim 1, wherein the activation request information is transmitted through a predetermined Medium Access Control (MAC) management message, an extended header or a signaling header.

4. A method for managing carriers of a mobile station (MS) by a base station (BS) in a wireless access system that supports multi-carrier, the method comprising:
    receiving activation request information from the MS through a primary carrier for indicating a carrier management mode of the MS according to power status of the MS;
    transmitting a carrier management command message to the MS for activating at least one secondary carrier indicated by the activation request information; and
    receiving a carrier management indication message from the MS for reporting carrier activation status, wherein the activation request information includes information related to a number of secondary carriers to be activated if the carrier management mode is a first mode, wherein the activation request information does not include the information related to the number of secondary carriers in order to activate all secondary carriers supported by the MS if the carrier management mode is a second mode, and wherein power status of the second mode is greater than power status of the first mode.

5. The method according to claim 4, wherein the activation request information includes at least a maximum number of secondary carriers to be activated or a minimum number of secondary carriers to be activated if the carrier management mode is the first mode.

6. The method according to claim 4, wherein the activation request information is received through a predetermined Medium Access Control (MAC) management message, an extended header or a signaling header.

7. A mobile station (MS) supporting a multi-carrier operation in a wireless access system, the MS comprising:
   a radio frequency (RF) module for transmitting and receiving radio signals; and
   a processor for controlling the RF module to:
   transmit activation request information to a base station (BS) through a primary carrier for indicating a carrier management mode of the MS according to power status of the MS;
   receive a carrier management command message from the BS for activating at least one secondary carrier indicated by the activation request information; and
   transmit a carrier management indication message to the BS for reporting carrier activation status after the MS activates the at least one secondary carrier,
   wherein the activation request information includes information related to a number of secondary carriers to be activated if the carrier management mode is a first mode,
   wherein the activation request information does not include the information related to the number of secondary carriers to be activated in order to activate all secondary carriers supported by the MS if the carrier management mode is a second mode, and,
   wherein power status of the second mode is greater than power status of the first mode.

8. The MS according to claim 7, wherein the activation request information includes at least a maximum number of secondary carriers to be activated or a minimum number of secondary carriers to be activated if the carrier management mode is the first mode.

9. The mobile station according to claim 7, wherein the activation request information is transmitted to the BS through a predetermined Medium Access Control (MAC) management message, an extended header or a signaling header.

* * * * *